United States Patent
Bhargava et al.

(10) Patent No.: US 6,934,621 B2
(45) Date of Patent: Aug. 23, 2005

(54) RE-ENTRY STRATEGY FROM BOOST MODE TO EGR MODE

(75) Inventors: Sameer Bhargava, Canton, MI (US); Ravishankar Ramamurthy, Inkster, MI (US); Brian A. Lewallen, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 28 days.

(21) Appl. No.: 10/627,520

(22) Filed: Jul. 25, 2003

(65) Prior Publication Data

US 2005/0021217 A1 Jan. 27, 2005

(51) Int. Cl.⁷ .................................................. B60T 7/12
(52) U.S. Cl. ............ 701/108; 123/568.21; 123/568.12; 123/568.22; 60/602; 60/605.2; 73/117.3; 73/118
(58) Field of Search ...................... 701/108; 123/568.12, 123/568.21, 568.22; 60/602, 605.2; 73/117.3, 118.1

(56) References Cited

U.S. PATENT DOCUMENTS

| | | | |
|---|---|---|---|
| 4,719,894 A | 1/1988 | Osada | |
| 5,577,484 A | 11/1996 | Izutani et al. | |
| 5,738,126 A | 4/1998 | Fausten | |
| 5,826,559 A | 10/1998 | Ichimoto et al. | |
| 5,953,905 A | 9/1999 | Jerger et al. | |
| 6,112,518 A | 9/2000 | Jerger et al. | |
| 6,216,461 B1 * | 4/2001 | Shao et al. | 60/605.2 |
| 6,305,167 B1 * | 10/2001 | Weisman et al. | 60/602 |
| 6,363,922 B1 * | 4/2002 | Romzek et al. | 123/568.16 |
| 6,457,461 B1 * | 10/2002 | Romzek | 123/568.16 |
| 6,523,340 B1 | 2/2003 | Kurihara et al. | |
| 6,619,033 B2 | 9/2003 | Adler et al. | |
| 6,659,071 B2 | 12/2003 | LaPointe et al. | |
| 6,681,171 B2 * | 1/2004 | Rimnac et al. | 701/108 |
| 2003/0192516 A1 | 10/2003 | Brunemann et al. | |

FOREIGN PATENT DOCUMENTS

GB 238470 2/1925
WO WO 2004/044406 A1 5/2004

* cited by examiner

Primary Examiner—Tony M. Argenbright
Assistant Examiner—Johnny H. Hoang
(74) Attorney, Agent, or Firm—Brooks Kushman P.C.

(57) ABSTRACT

A control for an internal combustion engine that includes an exhaust gas recirculation system predicts at least one of the intake manifold temperature in EGR mode or an intake manifold pressure in EGR mode, but preferably both, during Boost mode operation. The predictions are relied upon to calculate an intake manifold critical temperate in EGR, at which condensation would occur. The control then compares the predicted temperate value with the calculated intake manifold critical temperature, and if the predicted value exceeds the calculated temperature, the control commands re-entry into exhaust gas recirculation mode.

15 Claims, 3 Drawing Sheets

RE-ENTRY STRATEGY FROM BOOST MODE TO EGR MODE

BACKGROUND OF THE INVENTION

1. Field of the Invention

The present invention relates to compression ignition internal combustion engines including exhaust gas recirculation and variably operating between an exhaust gas recirculation mode and a boost mode, wherein an engine control monitors operating conditions to limit exhaust gas recirculation when operating conditions would permit condensation in the intake manifold and automatically reentering exhaust gas recirculation mode when the condensation conditions are alleviated.

2. Background Art

Condensation is a problem identified in engines using Exhaust Gas Recirculation (EGR). The hot exhaust gas from diesel engines includes a mixture of water vapor from the burnt fuel and ambient air. EGR engines recirculate a limited amount of exhaust gas back into the intake manifold to combust any unused fuel and byproducts. Due to the lower temperature of the intake air at the intake manifold, condensation may occur in the manifold when exhaust gas is mixed with fresh air in the intake manifold. For a given operating condition (with fixed air/fuel ratio (AFR), the variable degree of recirculation (% EGR) and intake manifold pressure (IMP)) and for a given ambient conditions such as ambient temperature (ATI) and relative humidity (ATIRH), the water vapor will condense at a dew point temperature. The dew point temperature is defined as the Intake Manifold Critical temperature (IMT_Critical). The condensate is acidic due to presence of compounds of Nitrogen and Sulfur from fuel. Nevertheless, the engine and the equipment in which it may be installed operate in wide ranges of ambient temperatures, for example, –25 deg C. to 50 deg C. and relative humidity 0% to 100%, for highway.

In a known engine control, when the measured Intake Manifold Temperature (IMT) becomes less than or equal to IMT_Critical, the engine control has been programmed to go into condensation mode and turn off EGR. Once EGR is turned off, the engine is running in a mode without exhaust gas recirculation. This operation is called the Boost mode. A timer then governs when the control pushes the engine back into the EGR mode. An IMT_Critical calculation is performed to validate the stay in EGR mode. If IMT is found to be below IMT_Critical, then EGR would be turned off. Once the engine is in Boost mode, previous controls do not and can not detect if condensation would occur when the EGR is turned on. Accordingly, unnecessary modes and transitions may be repeated. With the current strategy, the engine is stuck running in boost mode until the timer comes into effect even if the speed and load conditions of the vehicle change due to various reasons.

SUMMARY OF THE INVENTION

The present invention overcomes the above-mentioned disadvantages by providing a control and a method for reentering exhaust gas recirculation operation of an internal combustion engine. The control predicts intake manifold critical temperature and compares it with the actual intake manifold temperature. The control switches to boost mode in response to the determination that the IMT is below IMT critical. The control then predicts a value of intake manifold temperature, and preferably, predicts a value of intake manifold pressure that would occur if the engine operation was switched from boost mode to EGR mode. The predictions are used to determine a calculated IMT critical in EGR mode. The control then switches engine operation into exhaust gas recirculation mode when the predicted intake manifold temperature for EGR mode exceeds the calculated critical intake manifold temperature for EGR operation, a temperature at which condensation could occur in the intake manifold.

In the preferred embodiment, the control is provided with differential pressure and temperature tables, documenting the pressure and temperature differences, respectively, between operation in the recirculation mode and non-recirculation mode at various speeds and loads for determining the intake manifold pressure and temperature in the recirculation mode. An intake manifold temperature prediction in EGR mode is determined as the intake manifold temperature measured plus the differential intake manifold temperature from the first table. Similarly, the intake manifold pressure in EGR operation is predicted by adding the differential from the pressure table to the intake manifold pressure in the boost mode, the sum of the intake manifold pressure measured plus the differential intake manifold pressure from the second table. Although other selection criteria is possible, the tables are preferably prepared by empirically establishing the differentials in controlled variable operating conditions of the internal combustion engine.

Using both the tables, the control utilizes the predicted temperature and pressure values to determine a predicted or calculated critical intake manifold temperature if engine operation is switched to EGR mode. Then, the condensation equation determines a predicted IMT_critical in EGR mode as a function of the predicted temperature and pressure and other parameters. The equation, preferably a linear equation, may be one taught in copending application entitled "Influence Of Engine Parameters On Condensation Protection Strategies" filed concurrently with this application and incorporated by reference. The adjusted values of predicted temperature in EGR and predicted pressure in EGR as well as other functions such as the mass flow rate as derived from the EGR desired rate may be used. When the predicted intake manifold temperature in EGR mode is higher than the predicted IMT_critical in EGR mode, the control commands the engine to reenter the exhaust gas recirculation operating mode. Preferably, the command is enabled only after the sufficiently high predicted intake manifold temperature condition continues or has been maintained for a predetermined duration. Moreover, additional correction factors may be employed for changes in any conditions.

BRIEF DESCRIPTION OF THE DRAWINGS

The present invention will be more clearly understood by reference of the following detailed description of a preferred embodiment when read in conjunction with the accompanying drawing, in which like reference characters refer to like parts throughout the views, and in which.

DETAILED DESCRIPTION OF THE PREFERRED EMBODIMENT(S)

Figure 1:
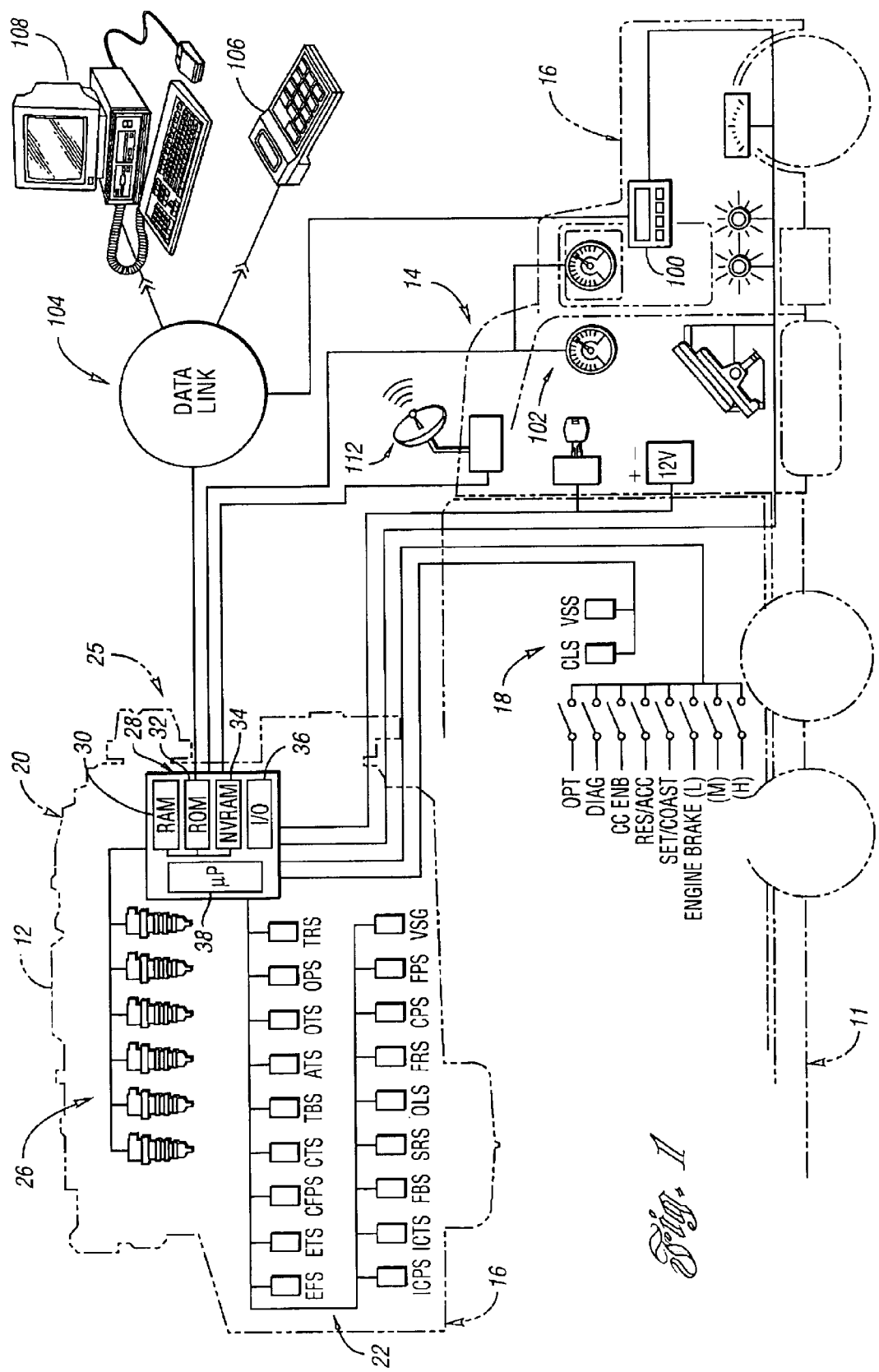
FIG. 1 is a diagrammatic view of equipment which is a vehicle or machinery and includes a perspective view of an engine with an engine control in accordance with the present invention.

FIG. 1 is a perspective view of a compression-ignition, internal combustion engine 20 incorporating various features of engine control according to the present invention. As will be appreciated by those of ordinary skill in the art, engine 20 may be used in a wide variety of equipment 11 for applications including on-highway trucks, construction equipment, marine vessels, and stationary generators, among others. Engine 20 includes a plurality of cylinders disposed below a corresponding cover, indicated generally by reference numeral 12. In a preferred embodiment, engine 20 is a multi-cylinder compression ignition internal combustion engine, such as a 4, 6, 8, 12, 16, or 24 cylinder diesel engine, for example. Moreover, it should be noted that the present invention is not limited to a particular type of engine or fuel.

Engine 20 includes an engine control module (ECM) 28. ECM 28 communicates with various engine sensors and actuators via associated cabling or wires, indicated generally by reference numeral 18, to form a controller 25 (FIG. 2) to control the engine 20 in equipment 11. In addition, controller 26 communicates with the engine operator using associated lights, switches, displays, and the like as illustrated in greater detail in FIG. 2. When mounted in a vehicle, engine 20 is coupled to a transmission via flywheel 16. As is well known by those in the art, many transmissions include a power take-off (PTO) configuration in which an auxiliary shaft may be connected to associated auxiliary equipment which is driven by the engine/transmission at a relatively constant rotational speed using the engine's variable speed governor (VSG). Auxiliary equipment may include hydraulic pumps for construction equipment, water pumps for fire engines, power generators, and any of a number of other rotationally driven accessories. Typically, the PTO mode is used only while the vehicle is stationary. However, the present invention is independent of the particular operation mode of the engine, or whether the vehicle is stationary or moving for those applications in which the engine is used in a vehicle having a PTO mode.

Figure 2:
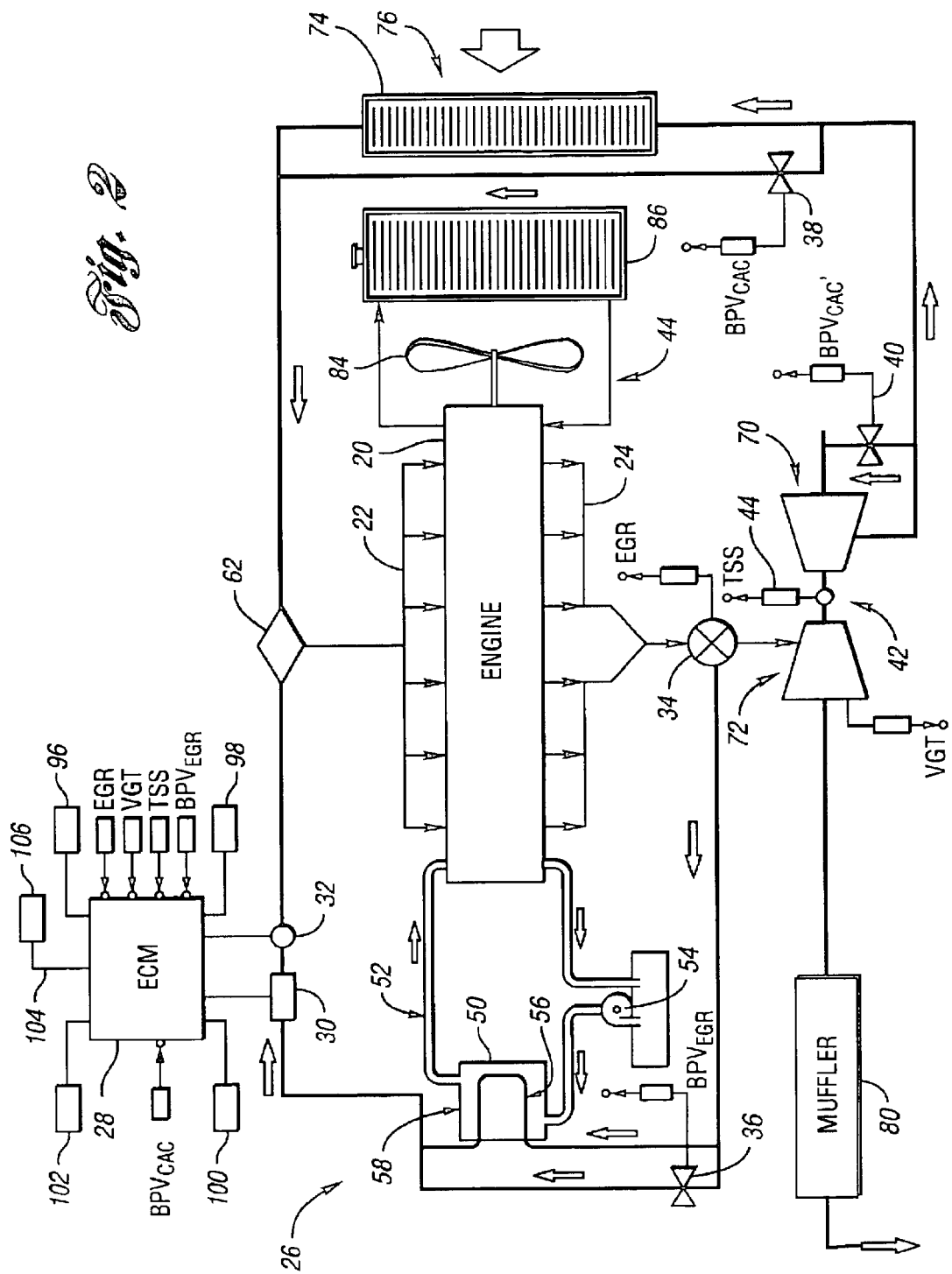
FIG. 2 is a diagrammatic and schematic view of a control system for exhaust gas recirculation operation in the engine of FIG. 1.

As better, shown in FIG. 2, ECM 28 of controller 25 may communicate with various vehicle output devices such as status indicators/lights 96, analog displays 98, digital displays 100, and various analog/digital gauges 102. In one embodiment of the present invention, ECM 28 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100. Preferably, ECM 28 includes control logic to determine current engine and ambient operating conditions to detect engine operating conditions, such as EGR condensation conditions, and control the engine accordingly to avoid EGR condensation. As described in greater detail below, ECM 28 preferably monitors engine speed and load, ambient temperature, EGR flow and temperature, turbo boost and/or manifold pressure, and air/fuel ratio to determine a threshold for activation of condensation avoidance strategies which may include selectively diverting at least a portion of the EGR flow around the EGR cooler to raise the intake manifold temperature and reduce or eliminate condensation of the recirculated exhaust gas. Similarly, at least a portion of the charge air may be selectively diverted around the charge air cooler.

A service tool 106 may be periodically connected via data link 104 to program selected parameters stored in ECM 20 and/or receive diagnostic information from ECM 28. Likewise, a computer may be connected with the appropriate software and hardware via data link 104 to transfer information to ECM 28 and receive various information relative to operation of engine 20, and/or vehicle 11.

Engine 20 includes an intake manifold 22, an exhaust manifold 24, and an exhaust gas recirculation (EGR) system indicated generally by reference numeral 26. An engine control module (ECM) 28 includes stored data representing instructions and calibration information for controlling engine 20. ECM 28 communicates with various sensors and actuators including EGR sensors such as EGR flow sensor 30 and EGR temperature sensor 32. ECM 28 controls EGR system 26 via actuators such as an EGR valve 34, EGR cooler bypass valve 36 ($BPV_{EGR}$), and optionally one or more charge air cooler bypass valves ($BPV_{CAC}$) 38, 40. In addition, ECM 28 preferably controls a variable nozzle or variable geometry turbocharger (VGT) 42 and monitors an associated turbo speed sensor 44 and turbo boost sensor EGR system 26 preferably includes an EGR cooler 50, which may be connected to the engine coolant circuit 52. EGR cooler 50 is preferably a full-flow cooler connected in-line with the engine coolant system, although other arrangements and types of EGR coolers may be used without departing from the scope of the present invention. EGR cooler 50 may be directly coupled to a corresponding water or coolant pump 54, or may be placed at a different location in the engine cooling circuit depending upon the particular application. In addition, EGR cooler 50 is preferably a two-pass cooler having a first pass 56 and second pass 58 for the recirculated exhaust gas passing through the core.

The EGR cooler bypass valve ($BP_{VEGR}$) 36 may be selectively operated by ECM 28 to control temperature of the EGR flow by diverting none, some, or all of the flow around EGR cooler 50 based on current ambient and engine operating conditions. Valve 36 may be a solenoid operated on/off valve so that some or all of the EGR flow will bypass EGR cooler 50 under operating and ambient conditions that promote condensation. Although a modulating bypass valve may be useful for some applications, it is not required because modulation of EGR valve 34 may be used to control the overall EGR flow. Similarly, one or more charge air bypass valves ($BPV_{CAC}$) 38, 40 may be provided to selectively raise the charge air temperature and consequently the intake manifold temperature. As illustrated, charge air bypass valve 40 selectively diverts none, some, or all of the charge air around charge air cooler 74. Alternatively, or in combination, bypass valve 40 diverts none, some, or all of the charge air from the outlet of turbocharger compressor 70 to the inlet to raise the inlet air temperature. Preferably, ECM 28 operates valves 36, and/or 38 and/or 40 to control the EGR temperature based on current ambient and operating conditions to reduce or eliminate condensation of the recirculated exhaust gas in the EGR circuit and the intake manifold. As described below, the control strategy may use ambient temperature, relative humidity, intake manifold temperature and pressure, air/fuel ratio, and % EGR to determine when to control EGR valve 34 and one or more bypass valves 36, 38, 40 to reduce or eliminate condensation.

In operation, ECM 28 controls EGR system 26 and VGT 42 based on current ambient and operating conditions and calibration information to mix recirculated exhaust gas with charge air via mixer 62, which is preferably a pipe union. The combined charge air and recirculated exhaust gas is then provided to engine 20 through intake manifold 22. In one preferred embodiment, engine 120 is a 6-cylinder compression-ignition internal combustion engine, although the number of cylinders and combustion type may be varied without departing from the present invention. ECM 28 includes control logic to monitor current ambient operating conditions, such as temperature and optionally, humidity, and engine control parameters and operating conditions to control EGR system 26. During operation of engine 20, intake air passes through compressor portion 70 of VGT 42 which is powered by turbine portion 72 via hot exhaust gasses. Compressed air travels through charge air cooler 74 which is preferably an air-to-air cooler cooled by ram air 76. Charge air passes through cooler 74 to mixer 62, which is preferably a pipe union, where it is combined with recirculated exhaust gas based on current engine operating conditions. Exhaust gas exiting engine 20 through exhaust manifold 24 passes through EGR valve 34 where a portion of the exhaust gas may be selectively diverted through EGR cooler 50. Bypass valve 36 is selectively operated to divert a portion (none, some, or all) of the diverted exhaust gas around cooler 50 to adjust the temperature of the recirculated exhaust gas. The EGR gases flow past EGR flow sensor 30 and temperature sensor 32 to mixing valve 62 where they are combined with compressed charge air. The remaining exhaust gasses not diverted by EGR valve 34 pass through turbine portion 72 of VGT 42 and muffler 80 before being exhausted to atmosphere. EGR cooler 50 cools the heated exhaust gas using engine coolant circuit 44. Engine coolant is in turn cooled via a cooling fan 84 and radiator 86.

As described above, one or more bypass valves may be added to the intake side of engine 20 upstream of charge air cooler (CAC) 74 to selectively divert some, all, or none of the charge air from compressor portion 70 of VGT 42. The charge air cooler (CAC) bypass valve(s) are selectively operated similar to EGR bypass valve 36 under ambient and operating conditions which may promote condensation within the intake manifold as described and illustrated. This strategy may be based on a measured, estimated, or predicted temperature for the charge air or the combined charge after mixing with EGR flow at mixer 62.

Figure 3:
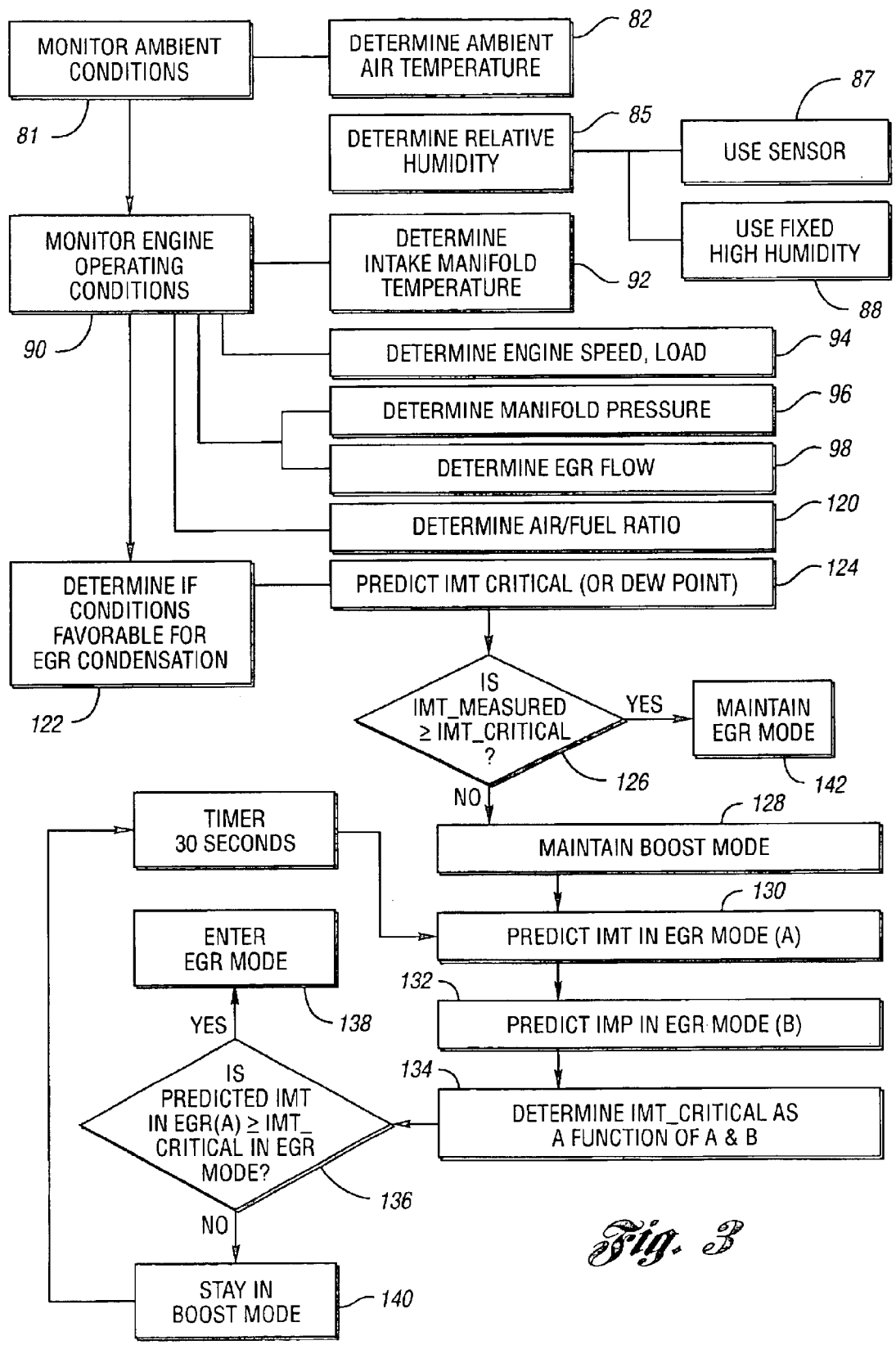
FIG. 3 is a block diagram of an engine control method program according to the present invention.

A block diagram illustrating operation of one embodiment for a system or method for controlling an engine to avoid EGR condensation according to the present invention is shown in FIG. 3. As will be appreciated by one of ordinary skill in the art, the block diagram of FIG. 3 represents control logic which may be implemented or effected in hardware, software, or a combination of hardware and software. The various functions are preferably effected by a programmed microprocessor, such as included in the DDEC controller manufactured by Detroit Diesel Corporation, Detroit, Mich. Of course, control of the engine/vehicle may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated in FIG. 3. For example, interrupt or event driven processing is typically employed in real-time control applications, such as control of an engine or vehicle rather than a purely sequential strategy as illustrated. Likewise, parallel processing, multitasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In various embodiments of the present invention, the control logic illustrated is implemented primarily in software and is stored in computer readable storage media within the ECM. As one of ordinary skill in the art will appreciate, various control parameters, instructions, and calibration information stored within the ECM may be selectively modified by the vehicle owner/operator while other information is restricted to authorized service or factory personnel. The computer readable storage media may also be used to store engine/vehicle operating information for vehicle owners/operators and diagnostic information for maintenance/service personnel. Although not explicitly illustrated, various steps or functions may be repeatedly performed depending on the type of processing employed.

In the representative embodiment of the present invention illustrated in FIG. 3, current ambient conditions are determined or monitored as represented by block 80. Ambient conditions may be determined using appropriate sensors or estimated or inferred depending upon the particular application. Preferably, block 80 includes at least a determination of the ambient air temperature as represented by block 82. The relative humidity may also be determined as represented by block 85 using a sensor as represented by block 87 or set to a predetermined value as represented by block 88. For example, rather than requiring a humidity sensor, the present invention may use a fixed high value for the relative humidity, such as 100%, which represents a very conservative calibration for over protection strategy. This provides the greatest protection or margin of error for operating without formation of EGR condensation in the intake manifold. Of course, lower stored humidity values may be used in determining whether to bypass the EGR cooler and/or charge air cooler, although lower values are more likely to result in some condensation under certain ambient and operating conditions.

Current engine operating conditions are monitored or determined as represented by block 90. This may include determining the intake manifold temperature 92, engine speed and load 94, intake manifold pressure 96, EGR flow 98, and air/fuel ratio 120. The EGR flow 98 and air/fuel ratio 120 may be determined based on scheduled values or based on actual sensed values depending upon the particular application. The current ambient and operating conditions determined in blocks 81 and 90, respectively, are then used to determine whether conditions are favorable for EGR condensation in the intake manifold as represented by block 122.

In one embodiment, a dew point of the combined EGR and charge air mixture is determined based on predicting IMT_critical in EGR mode as represented by block 124. The engine control then determines if IMT measured is less than IMT_critical to command entry to EGR mode or to select boost mode operation. Generally, the condensation problem is harmful only after a steady state condition of engine operation persists for an extended period, as the corrosive effect takes some time to develop under actual influencing conditions.

Preferably, controlling the engine also includes at least one of modifying charge air flow and modifying EGR flow, although other methods for adjusting the intake manifold temperature and condensation conditions may also be used in accordance with the present invention.

When the engine is running with the control command EGR ON, engine operation is defined as the EGR mode. IMT is measured and is called IMT_measured. IMP is measured and is called IMP_measured. IMT_measured and IMP_measured are used to calculate IMT-critical (dewpoint temperature of the gases in intake manifold) using an equation discussed earlier to define the critical temperature as a function of selected influences as shown at 124. If IMT_measured is not greater than or equal to IMT_critical, then EGR is shut OFF as shown at 128. Now the engine is operating in Boost mode (no EGR).

IMT and IMP are measured and are called IMT_measured_boostmode and IMP_measured_boostmode, respectively. These values are then adjusted to predict EGR mode values. Preferably, the two tables have been populated via experimental testing, but other sources of data may be relied upon without departing from the present invention. In the Delta-IMT Table 1, the temperature differential values are populated by running the engine in EGR mode and then in Boost mode at same speed and load. The difference in IMT from EGR mode to Boost mode is called IMT_delta. Preferably, Delta-IMP Table 2 is populated by pressure differential values in the same way as the Delta-IMT table and the values are called IMP_delta.

To predict the possibility of condensation at a new operating point after the exhaust gas recirculation has been turned off and the engine is operating in boost mode, the controller 26 will predict the possibility of condensation while staying in boost mode and determine if re-entry is possible without undesirable condensation by reliance upon information in the tables as discussed below. In the preferred embodiment, the tables have been determined empirically, although other sources for the differentials may be included without departing from the present. Nevertheless, the tables will be calibrated at a given ambient condition.

In other words, while the engine is running in Boost mode, the control adds IMT_delta to IMT_measured_boostmode and this becomes IMT_predicted_EGRmode, as shown at 130. Similarly, the control adds IMP_delta to IMP_measured_boostmode to obtain IMP_predicted_EGRmode, as shown at 132.

The predicted values are then employed in the processing of data in the control 26 through algorithms including a condensation equation to calculate an IMT_critical in EGR. An example of the equation taken from the related application discussed above is:

$$\text{IMT\_Critical} = x1*V1 + x2*V2 + x3*V3 + x4*V4 + x5*V5 + \\ x6*V1*V1 + x7*V2*V2 + x8*V3*V3 + \\ x9*V4*V4 + x10*V5*V5 + x11*V1*V2 + \\ x12*V1*V3 + x13*V1*V4 + x14*V1*V5 + \\ x19*V3*V5 + x20*V4*V5 + x21$$

Where, x1, x2, ... x21 are constants to be determined, and V1, V2, ... V5 are the engine parameters that are measured. When the intake manifold temperature predicted is greater than the calculated intake manifold temperature critical predicted, the control turns on the exhaust gas recirculation and the engine reenters the exhaust gas recirculation operating mode.

These values represent a prediction of the temperature and pressure, as well as the critical temperate expected if the

TABLE 1

RPM vs Load - Steady VNT Boost - 12.7 L 430 hp/1550 ft-lb

|  | 150 | 300 | 450 | 600 | 750 | 900 | 1050 | 1200 | 1350 | 1500 | 1650 | 1800 | 1950 | 2100 | 2250 | 2400 | 2550 |
|---|---|---|---|---|---|---|---|---|---|---|---|---|---|---|---|---|---|
| 0 | 10.3 | 5.2 | 0 | 6.9 | 13.8 | 15.5 | 15.5 | 12.1 | 10.3 | 12.1 | 15.5 | 17.2 | 19 | 17.2 | 17.2 | 17.2 | 17.2 |
| 12.5 | 10.3 | 5.2 | 0 | 10.3 | 22.4 | 24.1 | 24.1 | 25.9 | 29.3 | 32.8 | 37.9 | 39.7 | 41.4 | 44.8 | 48.3 | 48.3 | 48.3 |
| 25 | 10.3 | 10.3 | 10.3 | 20.7 | 31 | 32.8 | 34.5 | 43.1 | 50 | 53.5 | 55.2 | 58.6 | 60.3 | 60.3 | 58.6 | 58.6 | 58.6 |
| 37.5 | 10.3 | 10.3 | 10.3 | 24.1 | 37.9 | 39.7 | 43.1 | 62.1 | 81 | 74.1 | 65.5 | 70.7 | 77.6 | 70.7 | 63.8 | 63.8 | 63.8 |
| 50 | 12.1 | 12.1 | 12.1 | 32.8 | 53.5 | 56.9 | 60.3 | 84.5 | 112.1 | 117.2 | 122.4 | 119 | 115.5 | 110.4 | 105.2 | 105.2 | 105.2 |
| 62.5 | 13.8 | 13.8 | 13.8 | 55.2 | 96.6 | 103.5 | 110.4 | 120.7 | 124.1 | 139.7 | 143.1 | 134.5 | 127.6 | 119 | 110.4 | 110.4 | 110.4 |
| 75 | 13.8 | 13.8 | 13.8 | 56.9 | 100 | 108.6 | 115.5 | 129.3 | 150 | 162.1 | 162.1 | 162.1 | 160.4 | 155.2 | 150 | 150 | 150 |
| 87.5 | 17.2 | 17.2 | 17.2 | 65.5 | 115.5 | 124.1 | 134.5 | 150 | 165.5 | 181 | 187.9 | 184.5 | 181 | 172.4 | 162.1 | 162.1 | 162.1 |
| 100 | 22.4 | 22.4 | 22.4 | 74.1 | 127.6 | 124.1 | 144.8 | 170.7 | 184.5 | 210.4 | 215.5 | 208.6 | 200 | 187.9 | 174.1 | 174.1 | 174.1 |

TABLE 2

RPM vs Load - EGR Rate - 12.7 L 430 hp/1550 ft-lb

|  | 600 | 900 | 1150 | 1200 | 1270 | 1300 | 1350 | 1500 | 1550 | 1590 | 1650 | 1800 | 1850 | 1900 | 1950 | 2100 | 2250 |
|---|---|---|---|---|---|---|---|---|---|---|---|---|---|---|---|---|---|
| 0 | 0 | 0 | 0 | 1 | 1 | 1.06 | 1.5 | 1.75 | 1 | 1 | 1 | 1 | 1 | 1 | 1 | 2 | 2 |
| 12.5 | 0 | 0 | 1 | 1.5 | 1.63 | 2 | 2.19 | 1.94 | 1.94 | 2 | 2.06 | 2.38 | 2.5 | 2.63 | 3.44 | 3.75 | 3.75 |
| 25 | 0 | 0 | 2.38 | 2.5 | 2.75 | 2.75 | 3 | 3.38 | 3.69 | 3.75 | 4 | 4.25 | 3.5 | 3.69 | 3.56 | 3.69 | 3.69 |
| 37.5 | 0 | 0 | 2.19 | 2.31 | 2.56 | 2.69 | 2.69 | 3.44 | 3.63 | 3.75 | 4.19 | 4 | 4.75 | 4.81 | 3.63 | 2.94 | 2.94 |
| 50 | 0 | 0 | 2.25 | 2.5 | 2.88 | 3.06 | 3.25 | 4 | 4.5 | 4.75 | 5.19 | 5.94 | 6.63 | 6.5 | 5.19 | 5.81 | 5.81 |
| 62.5 | 0 | 0 | 2.44 | 2.81 | 3.19 | 3.38 | 3.44 | 4.63 | 5.06 | 5.19 | 5.81 | 6 | 6.81 | 6.69 | 5.75 | 5.75 | 5.75 |
| 75 | 0 | 0 | 2.88 | 3.25 | 3.75 | 3.88 | 4.13 | 5.31 | 5.88 | 6.06 | 7 | 7.5 | 8.25 | 8.25 | 6.19 | 6.81 | 6.81 |
| 87.5 | 0 | 0 | 3.31 | 3.69 | 4.19 | 4.44 | 4.94 | 6.19 | 6.63 | 6.88 | 7.94 | 7.75 | 8.25 | 8.25 | 6 | 6.06 | 6.06 |
| 100 | 0 | 0 | 3.5 | 4.06 | 4.75 | 4.88 | 5.25 | 5.94 | 6.06 | 6.06 | 6.69 | 7.75 | 8.38 | 8.38 | 5.69 | 5.94 | 5.94 |

When the engine is operating in boost mode, the intake manifold temperature in EGR is predicted by having intake manifold temperature measured in boost mode added to the differential taken from table 1 at the load and speed nearest operating conditions. This produces intake manifold temperature predicted. Similarly, the intake manifold pressure in the exhaust gas recirculation mode is predicted by detecting the intake manifold pressure in boost mode measured and adjusted by the differential of the intake manifold pressure between boost mode and EGR mode from table 2 at the selected speed and load range values.

engine were to be switched into the EGR mode although the engine is operating in boost mode. In other words, the control then uses the two predicted values to predict the IMT_critical temperature in EGR mode (IMT_critical_EGRmode). If IMT_predicted_EGRmode <IMT_critical_EGRmode, then the engine remains in Boost mode, as shown at 140. If IMT_predicted_EGRmode >IMT_critical_EGRmode, then the EGR can be turned ON and the engine will go into EGR mode, as shown at 138. Nevertheless, additional correction factors may be necessary for changes in ambient conditions, especially temperature and pressure. For example, in altitude, barometric compensation has to be made.

The IMT_critical value is continuously determined by an appropriate equation, preferably as a function of the parameters ambient temperature (ATI), the intake manifold (ATI), and the relative humidity (AIRH) the calculated critical intake manifold temperature (IMT *critical), intake manifold pressure (IMP), exhaust gas recirculation rate (EGR percentage). The EGR rate for the speed and load may be obtained from an EGR desired rate table, for example, an EGR desired rate table determined as a function of speed and load. Similarly, the intake manifold pressure is similarly predicted by the intake manifold pressure in boost mode plus the differential from the differential Table 2, as shown at 132. The process then calculates the IMT_critical in EGR as a function of ambient temperature of the intake, and the relative humidity at the intake and the intake manifold temperature critical thus determined as well as the intake manifold pressure, and EGR rate. The resulting value is compared with the predicted temperate. If predicted IMT is greater than the IMT_critical predicted, re-entry to the EGR mode will be commanded. Preferably, if the value of IMT_critical is greater than or equal the IMT_Critical EGR or dew point for a predetermined period, the command is enabled to adjust the current operating mode of the engine.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling exhaust gas recirculation of an internal combustion engine comprising:

determining a condition during engine operation in EGR mode at which an intake manifold temperature is below an intake manifold critical temperature at which condensation occurs in said intake manifold;

switching to a boost mode in response to said determining;

predicting a value of at least one of intake manifold temperature and intake manifold pressure if the engine were operated in EGR mode;

calculating an intake manifold critical temperature as a function of said predicting a value; and switching to exhaust gas recirculation mode when said predicted intake manifold temperature in EGR mode exceeds said calculated intake manifold critical temperature.

2. The invention as described in claim 1 wherein said predicting comprises measuring a value of said at least one of intake manifold pressure and intake manifold temperature during engine operation in Boost mode.

3. The invention as described in claim 2 wherein said predicting comprises adjusting said measured value of said at least one of intake manifold temperature and intake manifold pressure with a differential determined by a difference in measurement at Boost mode and at EGR mode.

4. The invention as described in claim 3 wherein said adjusting comprises selecting an adjustment value from a table of empirically determined values of said at least one of said intake manifold temperature and intake manifold pressure.

5. The invention as described in claim 4 wherein said table is generated as a function of engine load and engine speed.

6. The invention as described in claim 5 wherein said empirically determined values comprises a temperature or pressure reading in EGR mode less a temperature or pressure reading, respectively, in boost mode.

7. A computer readable storage medium having data stored therein representing instructions executable by a computer to control a compression ignition internal combustion engine installed in a vehicle to perform an exhaust gas recirculation re-entry from a boost mode operation, the computer readable storage medium comprising:

instructions for predicting a value of at least one of intake manifold temperature and intake manifold pressure in EGR mode from a measurement taken in Boost mode;

instructions for calculating an intake manifold critical temperature in EGR mode as a function of said predicted value; and instructions for switching to exhaust gas recirculation mode when said predicted intake manifold temperature in EGR mode exceeds said calculated intake manifold critical temperature in EGR mode.

8. The invention as described in claim 7 wherein said instructions for predicting comprises predicting each of said intake manifold temperature in EGR mode and intake manifold pressure in EGR mode.

9. The invention as described in claim 7 wherein said instructions for predicting include instructions for adjusting a measured value in Boost mode with a differential established as a function of engine speed and engine load.

10. The invention as described in claim 8 wherein said instructions for calculating include an equation determining intake manifold critical temperature in Boost mode as a function of both said predicted intake manifold temperature in EGR mode and said predicted intake manifold pressure in EGR mode.

11. The invention as described in claim 10 wherein said equation is a linear equation.

12. A system for controlling a compression ignition internal combustion engine in a vehicle with expedited re-entry to an exhaust gas recirculation operating mode from a boost mode operation comprising:

a monitor for determining boost mode operation;

a processor for predicting a value of at least one of intake manifold temperature and intake manifold pressure as a function of measuring said at least one in Boost mode;

calculating an intake manifold critical temperature as a function of said predicting a value; and a controller for switching to exhaust gas recirculation mode when said predicted temperature exceeds said calculated intake manifold critical temperature.

13. The invention as described in claim 12 wherein said system comprises a sensor for measuring said at least one of intake manifold temperature and intake manifold pressure in said Boost mode to provide a measured value.

14. The invention as described in claim 12 wherein said processor comprises a compensator for adjusting said measured value to an adjusted value representing EGR mode operation.

15. The invention as described in claim 14 wherein said compensator comprises at least one look-up table.

* * * * *